R. M. G. PHILLIPS.
LIQUID FUEL BURNER.
APPLICATION FILED OCT. 21, 1914.
1,161,524.
Patented Nov. 23, 1915.
5 SHEETS—SHEET 1.
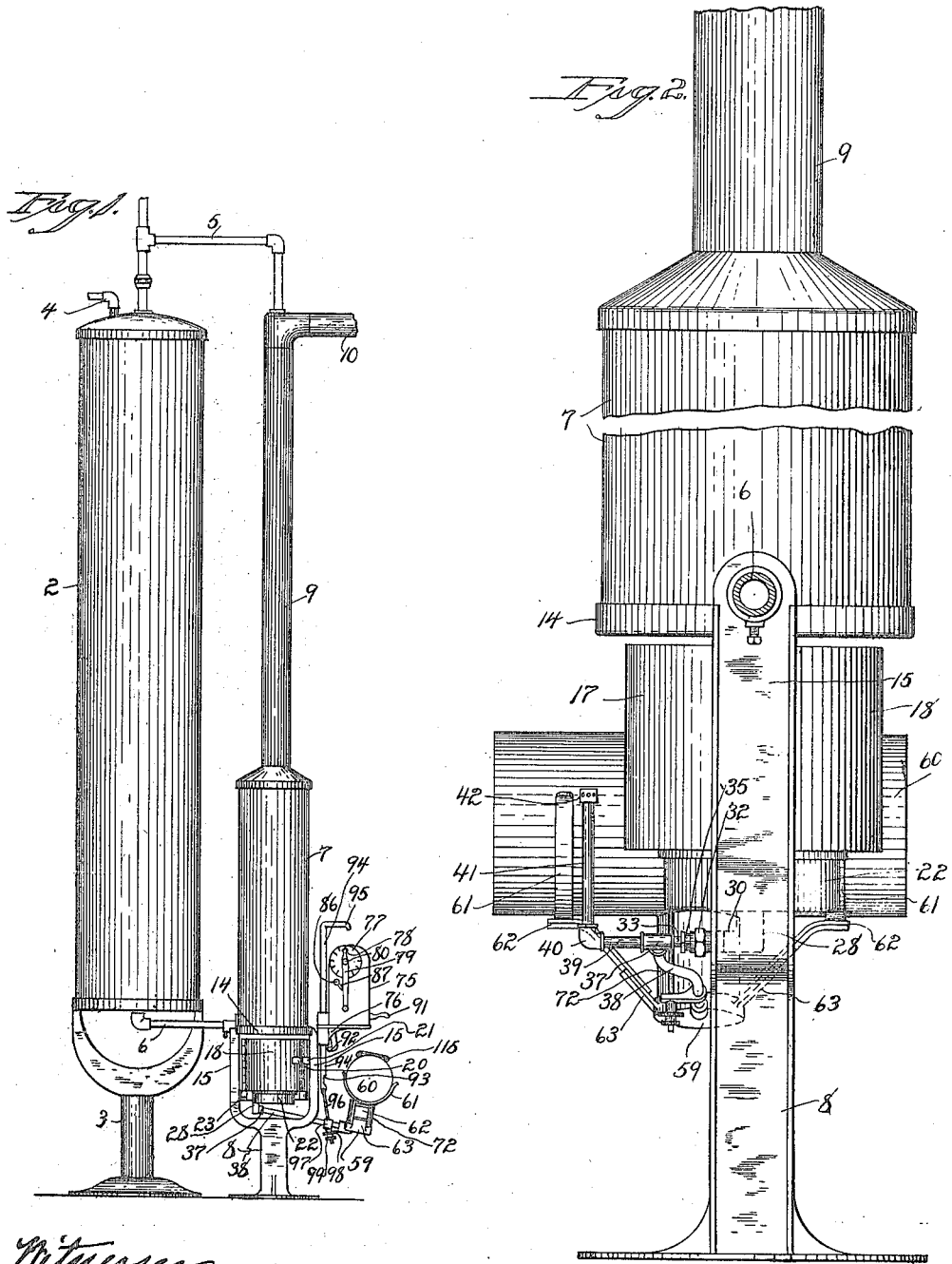

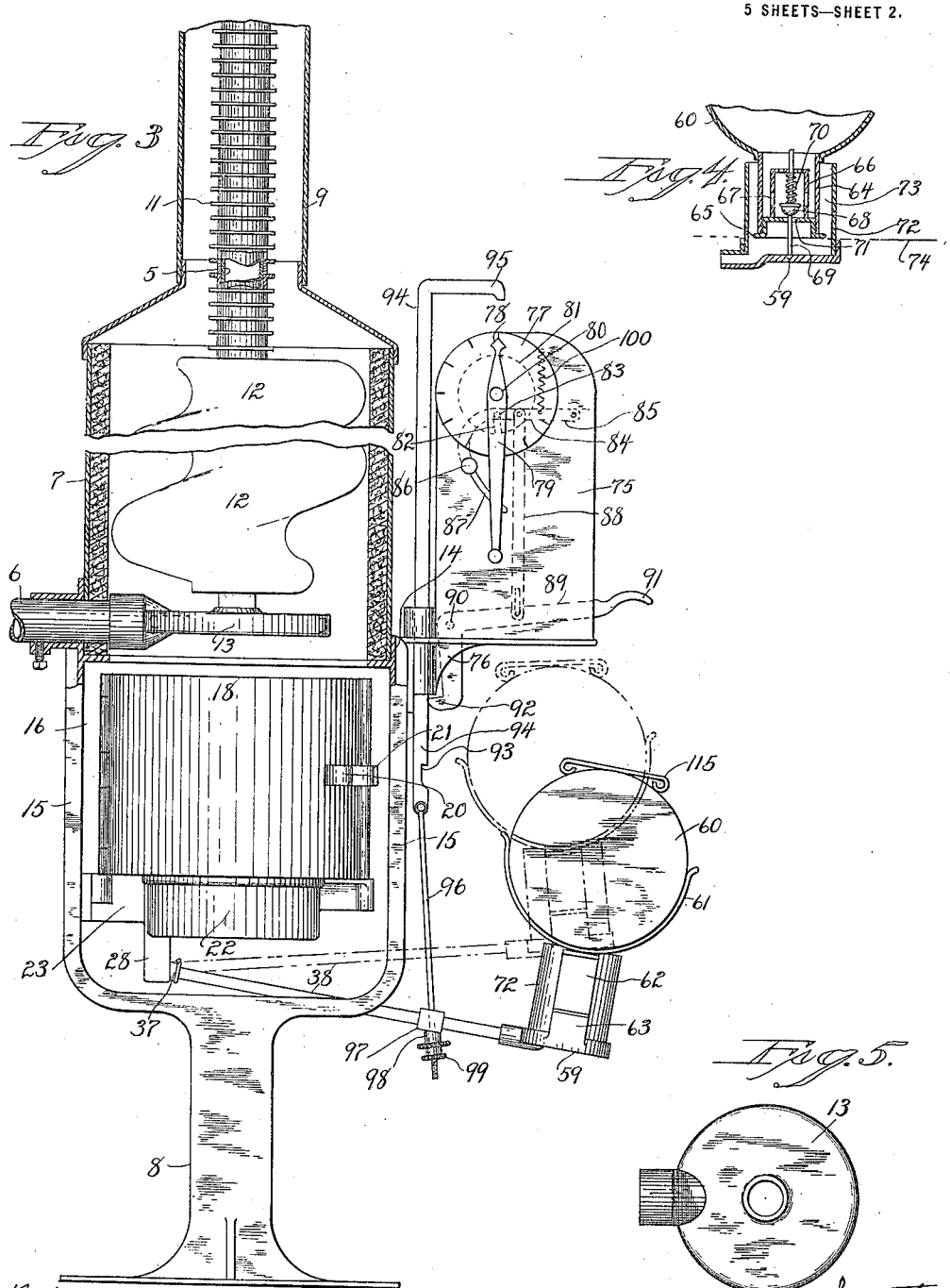

R. M. G. PHILLIPS.
LIQUID FUEL BURNER.
APPLICATION FILED OCT. 21, 1914.

1,161,524.

Patented Nov. 23, 1915.
5 SHEETS—SHEET 3.

R. M. G. PHILLIPS.
LIQUID FUEL BURNER.
APPLICATION FILED OCT. 21, 1914.
1,161,524.
Patented Nov. 23, 1915.
5 SHEETS—SHEET 4.
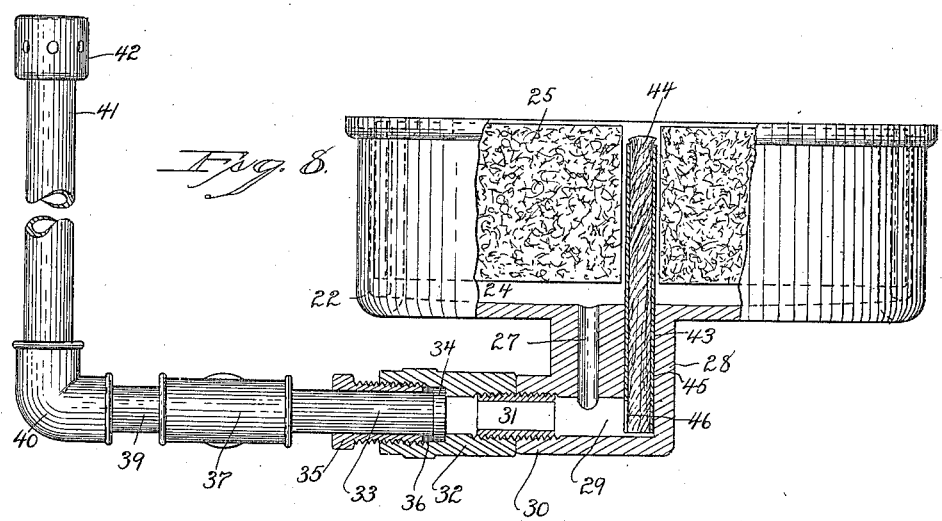
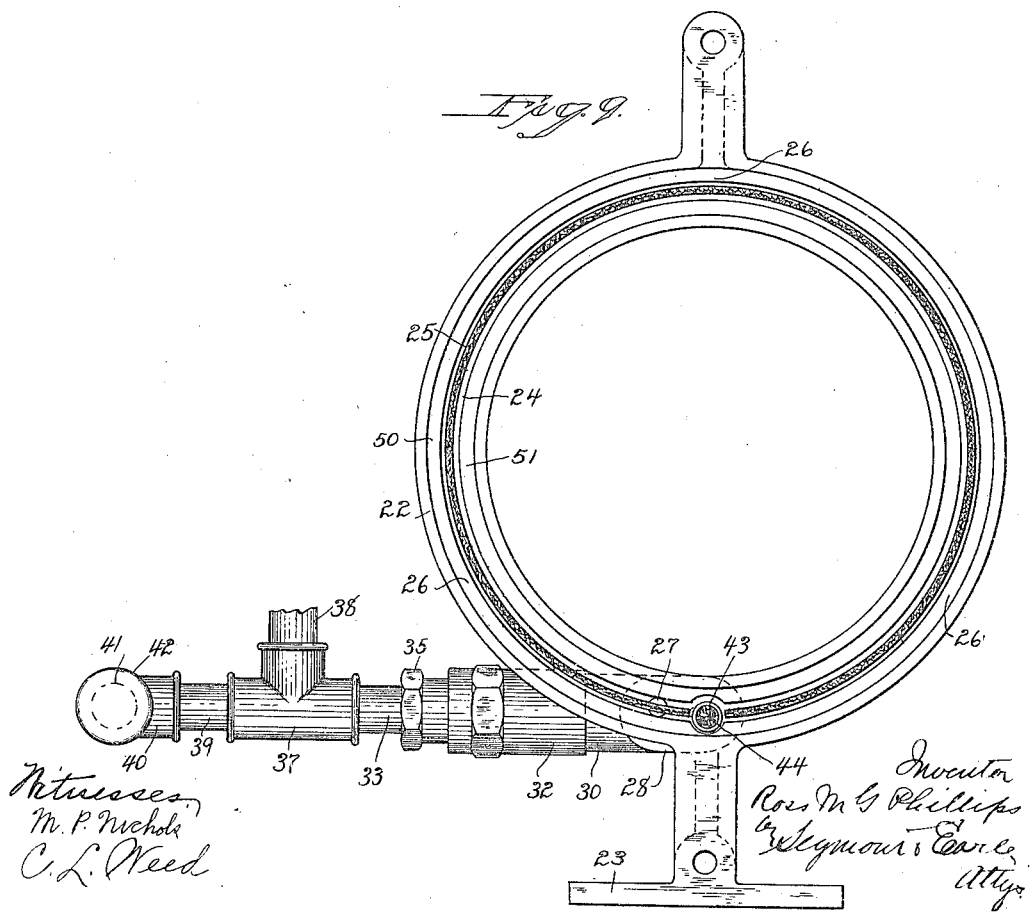

R. M. G. PHILLIPS.
LIQUID FUEL BURNER.
APPLICATION FILED OCT. 21, 1914.
1,161,524.
Patented Nov. 23, 1915.
5 SHEETS—SHEET 5.
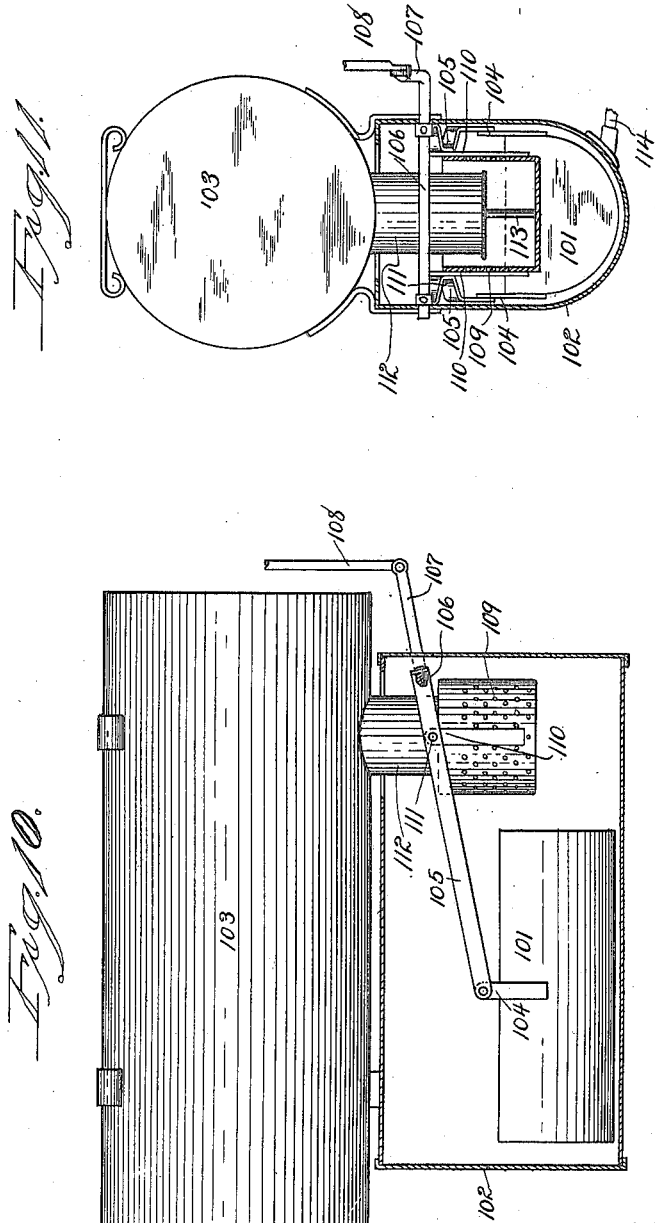

UNITED STATES PATENT OFFICE.

ROSS M. G. PHILLIPS, OF WEST HAVEN, CONNECTICUT.

LIQUID-FUEL BURNER.

1,161,524.  Specification of Letters Patent.  Patented Nov. 23, 1915.

Application filed October 21, 1914. Serial No. 867,744.

*To all whom it may concern:*

Be it known that I, ROSS M. G. PHILLIPS, a citizen of the United States, residing at West Haven, in the county of New Haven and State of Connecticut, have invented a new and useful Improvement in Liquid-Fuel Burners; and I do hereby declare the following, when taken in connection with the accompanying drawings and the characters of reference marked thereon, to be a full, clear, and exact description of the same, and which said drawings constitute part of this application, and represent, in—

Figure 6:
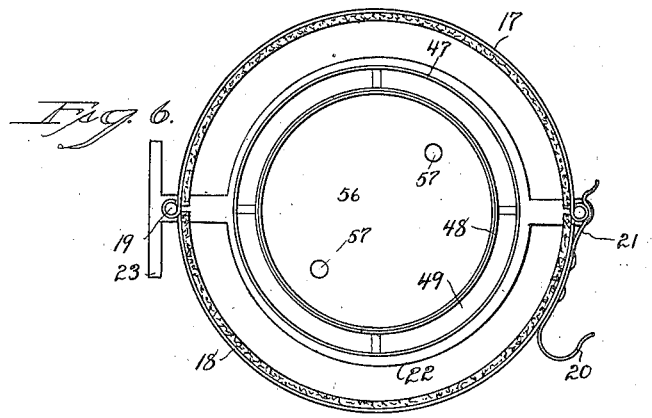
Figure 7:
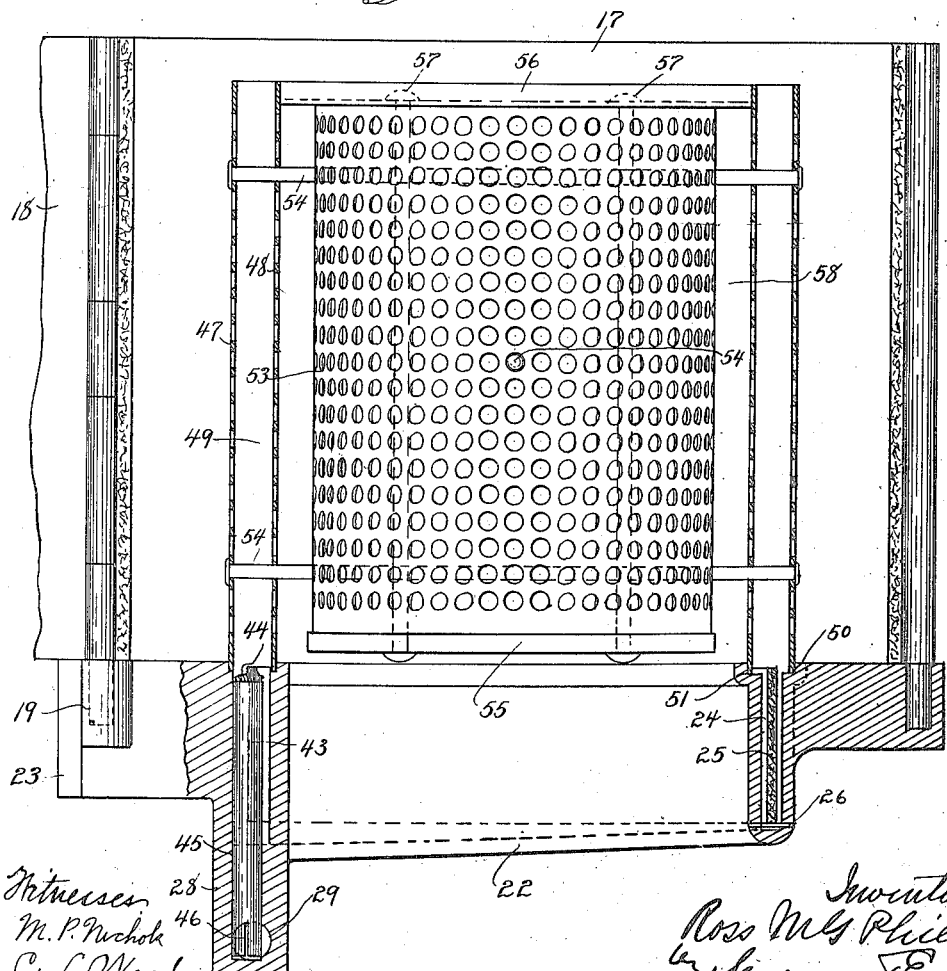

Figure 1 a view in front elevation of an automatic water-heater provided with one form which a liquid-fuel burner constructed in accordance with my invention may assume, the vertically movable oil-tank being shown in its depressed position in which the oil is drained away from the burner-wick to extinguish the light. Fig. 2 a broken view in side elevation of the same on an enlarged scale, omitting the boiler. Fig. 3 a broken view partly in front elevation and partly in vertical central section of the parts shown by Fig. 2, with the oil-tank shown in its lowered or non-feeding position by full lines and in its elevated or feeding position by broken lines. Fig. 4 a detached broken view in vertical central section, showing the means employed for feeding oil from the oil-tank. Fig. 5 a detached plan view of the chambered baffle of the heater proper. Fig. 6 a detached plan view of the burner and burner-casing. Fig. 7 a view partly in front elevation thereof and partly in vertical section with the door of the burner-casing in its open position. Fig. 8 a view of the burner-base partly in left hand elevation and partly in vertical section, showing its swivel-connection with the oil-tank, the pilot-light and oil-passages. Fig. 9 a plan view of Fig. 8. Fig. 10 a view partly in side elevation and partly in vertical section of another means which may be used to regulate the level of oil in the burner. Fig. 11 a view thereof partly in right hand elevation and partly in vertical section.

My invention relates to an improvement in liquid fuel burners designed with particular reference for use in conjunction with automatic water-heating apparatus, automatic cooking apparatus and the like, the object being to provide a simple, convenient, economical and reliable liquid fuel burner for use in such situations.

A further object of my invention is to provide such a burner with a pilot light by means of which it is automatically relighted after it has been flooded with kerosene or other liquid fuel.

A further object of my invention is to combine such a burner with the heater of a water boiler in the production of an automatic water heating apparatus.

With these ends in view, my invention consists in certain details of construction as will be hereinafter described and pointed out in the claims.

For the purpose of illustrating my improved burner, I have shown it as applied to an automatic water-heating apparatus. I would have it distinctly understood, however, that my improved burner structure is applicable for use in other situations, such as in automatic cooking apparatus, etc.

As herein shown I employ an ordinary water-boiler 2 mounted upon a standard 3 having a cold water inlet pipe 4, and upper and lower circulation pipes 5 and 6 (Fig. 1). The pipe 6 enters the lower end of a water-heater 7 mounted upon a standard 8 and furnished at its upper end with a concentric flue-pipe 9 which incloses the upright reach of the circulation pipe 5 to a point near the upper end thereof. At its upper end the pipe 9 is furnished with a chimney-pipe 10. The pipe 5 as shown is provided (Fig. 3) with heat-absorbing rings 11 of L-shaped cross-section which contribute to the total heating efficiency of the apparatus by absorbing heat units from the draft passing through the pipe 9 which constitutes a jacket for the pipe 5. At its lower end the pipe 5 sets into the upper end of a spiral heating coil 12 located within the heater 7 and connected at its lower end with a horizontally arranged chambered baffle 13 connected with the inner end of the lower circulation pipe 6. The lower end of the heater 7 is set into a horizontal ring 14 cast integral with the upper ends of the two vertical arms 15 of the base 8.

With reference now to the oil-burner forming the central feature of my present invention, it is located in the space 16 between the said arms 15 and comprises a circular burner-casing comprising a fixed semi-circular section 17 and a semi-circular door 18, the latter being hinged to the former at its left hand side by means of a pintle 19 and furnished at its right hand with a handle 20 shaped to form a spring latch 21 (Fig. 6). The said burner-casing is supported upon a cast annular burner-base 22 furnished at its inner end with a bracket 23 (Fig. 7) secured to the inner arm 15 of the base 8. The said burner-base 22 is formed with a deep annular oil-chamber or free wick-space 24 receiving an annular wick 25 the lower edge of which rests upon transverse pins 26 passing through the said space 24 which is readily flooded with and drained of oil without moving any part of the burner or the wick which latter clears the sides of the said space and is, as it were, suspended above the bottom thereof.

The bottom of the annular wick space 24 is inclined (Fig. 7) toward a vertical passage 27 formed in an arm 28 cast integral with and depending from the burner-base 22 and containing a horizontal passage 29 intersected by the aforesaid passage 27, the wick-space 24 being filled and drained through these passages 27 and 29. The said arm 28 is formed with a projection 30 (Fig. 8) internally threaded for the reception of a nipple 31 providing for the attachment of a sleeve-like swivel-seat fitting 32 receiving a tubular swivel 33 having a flange 34 fitting against a seat in the swivel-fitting 32, the said flange 34 being held against its seat by a nut-like swivel-gland 35 entered into the internally threaded outer end of the fitting 32. Between the inner end of the gland 35 and the outer face of the flange 34, I locate any suitable packing 36. The said swivel 33 is carried by one arm of a T-fitting 37 receiving an oil-supply pipe 38 (Fig. 9). The other arm of the said T-fitting is connected by a nipple 39 and elbow 40 with an upstanding vent-arm 41 surmounted by a perforated cap 42 which insures the free flowage of the oil by avoiding the creation of a vacuum.

The annular wick 25 is interrupted, as it were, by a pilot-light tube 43 standing in the annular oil-chamber or wick-space 24 which is slightly enlarged at this point to permit the oil to circulate around the tube 43, which receives a pilot-light wick 44 and extends downward through a bore 45 in the arm 28 into the oil-passage 29, the extreme lower end of the tube 43 being slotted at 46 to permit the access of oil from the passage 29 to the wick 44. Although the oil level rises and falls in the said space 24 for flooding and denuding the wick, it never falls below the level of the lower end of the pilot-light tube 43, whereby a constant supply of oil is furnished to the pilot-light wick 44.

Within the burner-casing consisting of the semi-circular shell 17 and the door 18, are located an outer and an inner perforated shell 47 and 48 separated by an annular flame-space 49 and having their lower edges set into grooves 50 and 51 formed by offsetting the upper ends of the inner and outer walls of the annular burner-base 22. The upper edge of the wick 25 rises very slightly into the lower end of the flame-space 49 which receives the flame (not shown) of the burning oil. To increase the efficiency of the burner, I place within it a perforated cylinder 53 smaller in diameter than the shell 48 and suspended upon horizontal pins 54 passed through perforations in the shells 47 and 48 (Fig. 7). The said cylinder 43 is closed at its lower end by means of a cap 55, and at its upper end by a cap 56, these caps being held in place by tie-rods 57, and the cap 56 being large enough in diameter to close the upper end of an annular space 58 formed between the shells 48 and 53.

Oil is fed to and withdrawn from the burner by the feed-pipe 38 (Fig. 3) which swings in a vertical plane upon the swivel 33 as a center and which carries at its outer end a cast oil-feed base 59 into which it is threaded and which carries a vertically movable horizontally arranged tank or reservoir 60 supported at its ends in cradle-like clips 61 riveted to the outer ends of supporting-arms 62 having their inner ends fastened to diverging arms 63 integral with the base 59. The tank 60 which is removable from the clips 61, is provided upon its lower face with a neck 64 (Fig. 4) the open end of which is closed by a removable threaded cap 65 carrying a concentric valve-chamber 66 having inlet openings 67 and containing a valve 68 mounted upon a valve-stem 69 encircled by a spring 70, the valve co-acting with a valve-seat 71 in the center of the cap 65, which is set inwardly and has the valve chamber 66 soldered to it. The valve-stem 69 is adapted in length to engage with the base 59 and lift the valve 68 from its seat 71. When the tank is in its elevated or feeding-position, the oil contained in it feeds by gravity into the base 59 which is provided with an oil-cup 72 enough larger in diameter than the neck 64 to form an annular air-space 73 between them. The normal oil-level in the base 59 is represented by the broken line 74, the oil being prevented from rising above this line by the pressure of the atmosphere. As the oil flows out of the base 59 into the feed-tube 38, a bubble of air entering the base from the air-space 73 will rise through the open valve 68 into the tank 60 from which a corresponding amount of oil will then be fed into the base and restore the oil therein to its normal level represented by the line 74.

To fill the tank 60, it is lifted from the clips 61 turned upside down and rested upon its standard 115. The filling-cap 65 is then removed for the filling operation, after which the said cap is replaced at which time the spring 70 encircling the valve-stem 69 holds the valve 68 down upon the seat 71 so that no oil can escape in restoring the tank 60 to position in the clips 61. However, just before the tank reaches its home position in the clips 61, the lower end of the stem 69 engages with the bottom of the base 59 and opens the valve 68 against the tension of the spring 70. From this time forward the base 59 will be kept filled with oil up to the level of the line 74. Oil is, however, fed from the tank 60 to the burner by the action of gravity only when the tank is maintained in its elevated position in which it is shown by broken lines in Fig. 3. For the purpose of holding the tank in this position, and for predetermining the period during which it will be so held, I employ an automatic controlling apparatus which may be of any desired construction, that chosen for illustration conforming generally to the timing-apparatus shown and described in my pending application Serial No. 782,445 filed Aug. 1, 1913. The said apparatus as far as shown in detail herein, consists of a case 75 mounted upon a bracket 76 secured to the outer arm 15 of the standard 8, near the upper end thereof. The said case 75 is provided upon its outer face with a graduated dial 77 swept by a pointer 78 formed upon the upper end of a setting-lever 79 located in front of the case 75 and mounted upon an arbor 80 carrying a timing-disk 81 located within the case and formed with a timing-slot 82 receiving a timing-pin 83 in a lever 84 hung upon a pin 85 and furnished with a handle 86 projecting through a clearance-slot 87 in the case 75. The said lever 84 is connected by a link 88 with a latch 89 hung upon a stud 90 and having a forestalling handle 91 and a nose 92, which latter coacts with a notch 93 in the lower end of a vertically movable manual operating-rod 94 terminating at its upper end in a handle 95, the lower end of the said rod 94 being pivotally connected by a link 96 with an arm 97 offsetting from the pipe 38. The link 96 is furnished with a regulating-nut 98 and a check-nut 99, whereby the high and low oil levels in the burner are regulated. A spring 100 exerting an upward draft on the lever 84, is provided for disengaging the nose 92 of the latch 89 from the notch 93 of the rod 94 for the descent of the tank 60 and the drainage of the oil from the burner, whereby the same is automatically extinguished.

Supposing the pilot-light wick 44 to be lighted, the timing-device is set by means of its lever 79 to predetermine the length of the heating period. The operating-rod 94 is now manually lifted by its handle 95, whereby the feed-tube 38 and tank 60 are lifted into their elevated or feeding positions as shown in broken lines in Fig. 3, being held in these positions by the entrance of the nose 92 of the latch 89 into the notch 93 in the rod 94. As soon as the tank 60 has been elevated into its feeding position, the oil begins to flow into the bottom of the annular oil-chamber 24 in which it rises so as to flood the asbestos wick 25 which is ignited from the pilot-light wick 44. The flame and other heated products of combustion now rise against the baffle 13 and are by the same deflected around the spiral heating-coil 12 and enter the flue-pipe 9 in traversing which additional heat units are extracted for heating the water in the circulation pipe 5, by means of the rings 11. At the conclusion of the period to which the timing-device was set, the pin 83 in the lever 84 is brought into registration with the slot 82 in the reversely rotating timing-disk 81. The spring 100 now smartly lifts the lever 84 which through its link 88 operates the handle 89 to retract the nose 92 from the notch 93 in the rod 94. The weight of the tank 60 now causes the same to descend into its depressed or non-feeding position in which it is low enough to drain the oil from the oil-chamber 24 to a level below the wick 25 which will be automatically extinguished. But in its lowered position the tank 60 continues to feed oil to the pilot-light tube 45 so that the pilot-light will be kept going in readiness to automatically relight the wick when the oil-chamber 25 is again flooded by the manual lifting of the tank back into its elevated or feeding position.

Instead of changing the oil-level by raising and lowering the oil-tank 60, I may accomplish the same end by employing such means as are shown in Figs. 10 and 11 in which the level of the oil is raised and lowered by means of a displacement-float 101 in a float-chamber 102 located below the oil tank 103 which in this case is stationary. The said float 101 is provided upon its opposite sides with two bail-ears 104 by which it is suspended from a pair of yoke-like arms 105 fastened to a rock-shaft 106 journaled in the side walls of the float-chamber 102, the said rock-shaft being furnished with a crank-arm 107 connected with the lower end of a link 108 corresponding to the link 96 of the construction first described. A perforated cup 109 corresponding in function to the cup 72, is provided with bail-straps 110 by means of which it is pivotally suspended from the arms 105 which for this purpose are set inwardly as shown in Fig. 11, the arms 110 being pivoted to the yoke-like arms 105, by pins 111. The cup 109 receives the neck 112 of the tank 103, oil being fed from the neck through a valve, not shown, but mounted upon a stem 113 corresponding to the stem 69.

The mechanism employed for feeding oil from the tank 103 into the float-chamber 102 may correspond to the mechanism illustrated in Fig. 4. From the float-chamber 102 a feed-tube 114 corresponding to the feed-tube 38, leads to the burner. When the operating-rod, not shown, but corresponding to the rod 92, is manually lifted, the float 101 will be immersed in the oil in the float-chamber and effect a sufficient displacement of the oil to raise its level in the burner so as to flood the wick. When the timing-mechanism releases the link 108, the float 101 on account of its bouyancy will rise to the surface of the oil in the float-chamber with the effect of draining enough oil from the wick-chamber to extinguish the wick. I do not therefore limit myself to any particular means for changing the oil-lever in the burner, but broadly claim all means for that purpose in an apparatus of the character herein disclosed.

Broadly speaking, my improved liquid-fuel burner is characterized by a wick-chamber manually flooded and maintained in its flooded condition by cocking means for a predetermined period by an automatic time-controlled releasing means which at the termination of such period, trips the cocking device and thus permits the wick-chamber to be drained of oil.

My device is further characterized by a pilot light constantly supplied by a source of oil unaffected by the flooding and draining of the wick-chamber.

I claim:—

1. In a liquid-fuel burner for automatic heating apparatus, the combination with a wick-chamber, of a wick located therein, manually operable means for flooding the said chamber with oil, cocking means for maintaining the said chamber in its flooded condition, and automatic time-controlled releasing means for tripping the said cocking means for the draining of the wick-chamber.

2. In a liquid-fuel burner for automatic heating apparatus, the combination with a wick-chamber, of a wick located therein, an oil tank connected with the said chamber, means for manually raising the said tank for flooding the said chamber, cocking means for holding the tank in its raised oil-feeding position, and time-controlled automatic releasing means for tripping the cocking means to permit the tank to descend into position for draining the wick-chamber.

3. In a liquid-fuel burner for automatic heating apparatus, the combination with a wick-chamber, of a wick located therein, manually operable means for flooding the said chamber with oil, cocking means for maintaining the said chamber in its flooded condition, automatic time-controlled releasing means for tripping the said cocking means after the lapse of a predetermined time, for draining the oil from the wick-chamber, and a pilot light arranged to be supplied with oil when the said wick-chamber has been drained of oil to a level below the wick.

4. In a liquid-fuel burner for automatic heating apparatus, the combination with a wick-chamber, of a wick located therein, manually operable means for flooding the said chamber with oil, cocking means for maintaining the said chamber in its flooded condition, automatic time-controlled releasing means for tripping the said cocking means to permit the oil to be drained from the said chamber, and a pilot light the wick whereof is arranged to extend below the wick aforesaid so as to be supplied with oil after the wick-chamber has been drained.

5. In a liquid-fuel burner for automatic heating apparatus, the combination with an annular wick-space or oil-chamber, of an annular wick located in said chamber, a pilot-light tube interposed in the wick manually operable means for flooding the wick-chamber with oil, and means for automatically draining the oil from the said chamber to a level below the bottom of the wick but above the intake of the pilot-light tube.

6. In a liquid-fuel burner for automatic heating apparatus, the combination with an annular wick-space or oil-chamber, of an annular wick suspended therein above the bottom thereof, a pilot-light tube located in the said chamber, intersecting the said wick and extending below the lower edge thereof, manually operable means for flooding the said chamber with oil, and means for automatically draining the oil from the said chamber to a level below the lower edge of the wick but above the level of the intake of the pilot-light tube.

7. In a liquid fuel burner for automatic heating apparatus, the combination with a burner-base having an annular wick-space and an oil passage, the bottom of the said space being inclined toward the said passage, of a pilot-light tube intersecting the said space and communicating with the said passage, an annular wick suspended in the said space, manually operable means for flooding the said space with oil, and means for automatically draining the oil from the said wick without withdrawing it from the intake of the pilot-light tube.

8. In a liquid-fuel burner, the combination with a burner-base having a wick-chamber, of a wick located therein, an oil tank connected with the said chamber, manually operable means for flooding the said chamber with oil from the said tank, cocking means for maintaining the said wick-chamber in its flooded condition, and time-controlled automatic releasing means for releasing the cocking means to permit the wick-chamber to drain.

9. In a liquid-fuel burner for automatic heating apparatus, the combination with a burner-base having a wick-chamber, of a wick located therein, an oil tank having swivel connection with the said burner-base, manually operable means for lifting the said tank into position for flooding the wick-chamber, cocking means for maintaining the tank in its raised oil-feeding position, and automatic time-controlled releasing means for tripping the cocking means to permit the tank to descend into its non-feeding position.

10. In a liquid-fuel burner for automatic heating apparatus, the combination with a burner-base having a wick-chamber, of a wick located therein, manually operable means for flooding the said chamber with oil, cocking means for maintaining the said chamber in its flooded condition, time-controlled automatic releasing means for tripping the cocking means at a predetermined time to permit the oil to be drained from the said chamber to a level below the wick, and a vent connected with the said chamber to prevent the creation of a vacuum therein consequent upon the withdrawal of oil therefrom.

In testimony whereof, I have signed this specification in the presence of two subscribing witnesses.

ROSS M. G. PHILLIPS.

Witnesses:
  CLARA L. WEED,
  M. P. NICHOLS.